(12) United States Patent
Attar et al.

(10) Patent No.: US 7,411,974 B2
(45) Date of Patent: Aug. 12, 2008

(54) WIRELESS COMMUNICATION RATE SHAPING

(75) Inventors: Rashid A. Attar, San Diego, CA (US); Christopher G. Lott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1086 days.

(21) Appl. No.: 10/295,659

(22) Filed: Nov. 14, 2002

(65) Prior Publication Data

US 2004/0202136 A1 Oct. 14, 2004

(51) Int. Cl.
*H04J 3/16* (2006.01)
(52) U.S. Cl. ............... 370/465; 370/328; 370/335; 370/252; 370/342; 455/450; 455/522
(58) Field of Classification Search ............ 370/328, 370/335, 252, 342, 465; 455/450, 522
See application file for complete search history.

(56) References Cited

U.S. PATENT DOCUMENTS

| | | | |
|---|---|---|---|
| 5,442,625 A | 8/1995 | Gitlin et al. | |
| 5,596,570 A | 1/1997 | Soliman | |
| 5,734,720 A | 3/1998 | Salganicoff | |
| 6,108,372 A | 8/2000 | Tidemann et al. | |
| 6,477,373 B1 | 11/2002 | Rappaport et al. | |
| 6,507,294 B1 | 1/2003 | King | |
| 6,735,448 B1 * | 5/2004 | Krishnamurthy et al. | 455/522 |
| 6,741,862 B2 * | 5/2004 | Chung et al. | 455/452.1 |
| 7,058,124 B2 | 6/2006 | Koo | |
| 7,146,174 B2 * | 12/2006 | Gardner et al. | 455/453 |
| 2001/0034236 A1 * | 10/2001 | Tong et al. | 455/450 |
| 2002/0015388 A1 | 2/2002 | Kim et al. | |
| 2002/0151310 A1 * | 10/2002 | Chung et al. | 455/452 |

(Continued)

FOREIGN PATENT DOCUMENTS

EP 1077580 2/2001

(Continued)

OTHER PUBLICATIONS

Chung et al. "Per-User Reverse Rate Control for Shared Packet Data Channel in 1xEV-DV." Airvana Incorporated, 3GPP2-C50-20010212-012, 2001, pp. 1-11.

(Continued)

*Primary Examiner*—Edan Orgad
*Assistant Examiner*—Andrew C Lee
(74) *Attorney, Agent, or Firm*—Howard Seo; Donald C. Kordich; Thomas R. Rouse

(57) ABSTRACT

Reverse Link (RL) data rate allocation in a High Data Rate (such as 1xEV-DO) system as a function of Forward Link (FL) channel quality. Rate shaping of a throughput profile for multiple Access Terminals (ATs) is performed by adjusting transition probabilities associated with a data rate allocation algorithm. The RL maximum data rate per AT is adjusted to reduce the loading in a designated area and result in rate shaping of the cell and/or sector. In one embodiment, the maximum data rates are adjusted as a function of the FL Signal to Interference and Noise Ratio (SINR), such as measured per serving sector or as a captured sum total of FL SINR. In still another embodiment, the maximum data rates are adjusted as a function of differences in rise-over-thermal values between neighboring sectors.

28 Claims, 7 Drawing Sheets

| RATE INDEX | DATA RATE |
|---|---|
| 1 | 9.6 |
| 2 | 19.2 |
| 3 | 38.4 |
| 4 | 76.8 |
| 5 | 153.6 |

$$P_{up} = [P_0 \ P_1 \ P_2 \ P_3 \ P_4]$$

$$P_{DN} = [P_5 \ P_6 \ P_7 \ P_8 \ P_9]$$

INDEX = ↑ ↑ ↑ ↑ ↑
        1   2   3   4   5

U.S. PATENT DOCUMENTS

2002/0159395 A1 10/2002 Nelson, Jr. et al.
2002/0193133 A1* 12/2002 Shibutani .................... 455/522
2003/0002518 A1* 1/2003 Shibutani .................... 370/442

FOREIGN PATENT DOCUMENTS

| EP | 1231807 | 8/2002 |
|---|---|---|
| WO | 99/23844 | 5/1999 |
| WO | 0014900 | 3/2000 |
| WO | 0038348 | 6/2000 |
| WO | 0103357 | 1/2001 |
| WO | 01/24004 | 4/2001 |
| WO | 0124568 | 4/2001 |

OTHER PUBLICATIONS

International Search Report, PCT/US03/036085, International Search Authority EPO, Aug. 16, 2004.

* cited by examiner $P_{up} = [P_0 \ P_1 \ P_2 \ P_3 \ P_4]$ $P_{DN} = [P_5 \ P_6 \ P_7 \ P_8 \ P_9]$

INDEX = 1 2 3 4 5

| RATE INDEX | DATA RATE |
|---|---|
| 1 | 9.6 |
| 2 | 19.2 |
| 3 | 38.4 |
| 4 | 76.8 |
| 5 | 153.6 |

| <0dB | 38.4 kbps | 3 |
|---|---|---|
| 0dB - 4dB | 76.8kbps | 4 |
| > 4dB | 153.6kbps | 5 |

WIRELESS COMMUNICATION RATE SHAPING

CROSS REFERENCE

The present Application for Patent is related to the following co-pending U.S. Patent Applications:

"WIRELESS COMMUNICATION RATE SHAPING" by Attar et al., having having U.S. application Ser. No. 10/295,659, filed concurrently herewith, assigned to the assignee hereof, and expressly incorporated by reference herein.

BACKGROUND

1. Field

The present invention relates generally to wireless communication, and particularly to reverse link rate allocation for packet data transmissions.

2. Background

In a wireless communication system, such as a system supporting packetized data communications, a radio link for transmissions from an Access Network (AN), or system infrastructure, to an Access Terminal, or remote user, is referred to as a downlinik or Forward Link (FL). The radio link for transmissions from the AT to the AN is referred to as the uplinik or Reverse Link (RL). Each AT determines an appropriate data rate for RL transmissions. Various methods for determining RL transmission rates from an AT are discussed in "SYSTEM AND METHOD FOR PERSISTENCE-VECTOR-BASED MODIFICATION OF USAGE RATE ASSIGNMENT," by Gadi Karmi, et al., having U.S. patent application Ser. No. 09/410,199, filed on Sep. 30, 1999, now U.S. Pat. No. 6,535,523, issued Mar. 18, 2003 and assigned to the assignee hereof.

In a High Data Rate system, such as a system supporting the "cdma2000 High Rate Packet Data Air Interface Specification,' referred to herein as "1xEV-DO," or IS-856, the AT autonomously determines a data rate for transmissions on the RL based on a probabilistic algorithm that considers the amount of data pending, the available transmit power or PA (power amplifier) headroom, the closed loop resource allocation calculation, and the maximum data rate as indicated to the AT by the AN. The AN assigns probabilities to each of the possible rate transitions that an AT may make. Each AT uses the same probabilities, which are predetermined and set at each AT.

Additionally, each AT implements a power control mechanism to adjust the transmit power dynamically. The adjust in AT transmit power compensates for changes in AT location, shadowing and fading experienced by the AT and the transmit data rate. As an AT moves farther away from a Base Station (BS) in the Active Set (AS) of the AT, the transmit power of the AT increases to compensate. Generally, as an AT moves toward a sector boundary, the interference caused by the AT in question to other AT's is increased due to an increase in the AT transmit power.

As the rate allocation algorithm considers the transmit power, an AT far from the AN, or otherwise experiencing a poor channel condition, relative to other ATs, may be subject to low data rates for an extended time period. In many communication systems, however, there is a desire to provide an equal grade of service. In other words, each AT is provided an approximately equal opportunity to transmit data on the RL without regard to channel condition so as not to penalize an AT for moving within the system. However, this mechanism does not take into account the interference due to an AT.

An increase in data rate results in an increase in the interference caused by an AT to other ATs in the system and therefore, there is a desire to discourage and/or prohibit that AT from transmitting at higher rates if that AT is likely to cause excessive interference to other AT's in the system. Further, there is a desire for each AT to transmit at maximum rate conditioned on equal interference considering all ATs in the system.

There is a need, therefore, for AT rate allocation that balances an equal grade of service goal with the desire to maximize capacity of the system. Similarly, there is a need for AT rate allocation that provides a robust RL and reduces interference to other users. There is further a need for reverse link rate allocation to achieve better control over other-cell interference and improve system stability.

DETAILED DESCRIPTION

The field of wireless communications has many applications including, e.g., cordless telephones, paging, wireless local loops, Personal Digital Assistants (PDAs), Internet telephony, and satellite communication systems. A particularly important application is cellular telephone systems for mobile subscribers. As used herein, the term "cellular" system encompasses both cellular and Personal Communication Services (PCS) frequencies. Various over-the-air interfaces have been developed for such cellular telephone systems including, e.g., Frequency Division Multiple Access (FDMA), Time Division Multiple Access (TDMA), and Code Division Multiple Access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well-known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA and 3GPP2. Another CDMA standard is the W-CDMA standard, as embodied in $3^{rd}$ *Generation Partnership Project "3GPP"*, Document Nos. 3G TS 25.211, 3G TS 25.212, 3G TS 25.213, and 3G TS 25.214. The telecommunication standards cited above are examples of only some of the various communication systems that can be implemented.

Figure 1:
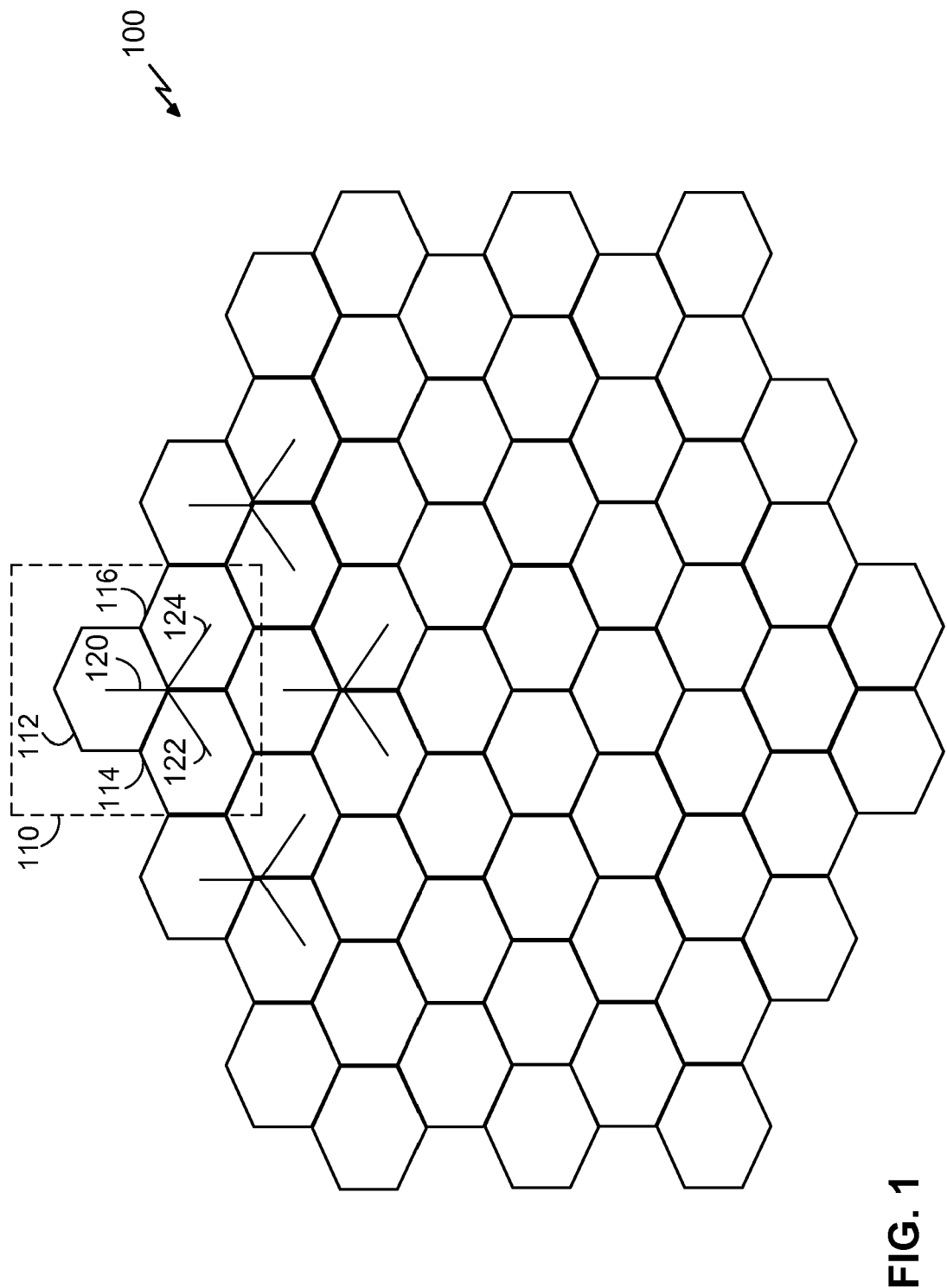
FIG. 1 is a cellular communication system supporting packetized data transmissions.

FIG. 1 illustrates a cellular communication system 100 according to one embodiment. The system 100 includes multiple cells, each covering a geographical area. Each of the multiple cells includes multiple sectors. For example, cell 110 includes the sectors 112, 114, and 116. Each of the sectors is defined by an antenna. As illustrated, the antenna element 120 is directed within the sector 112; the antenna element 122 is directed within the sector 114; and the antenna element 124 is directed within the sector 116. Examples of further antenna structures and base station arrangements are illustrated in FIG. 1. The system 100 is provided as an example for the following discussion. Note that alternate systems may implement alternate arrangements and configurations, wherein the number of antenna elements per sector and the number of sectors per cell may vary. Note that alternate embodiments may have different terminology for similar functional units, and may incorporate different configurations of components and functional units.

Figure 2A:
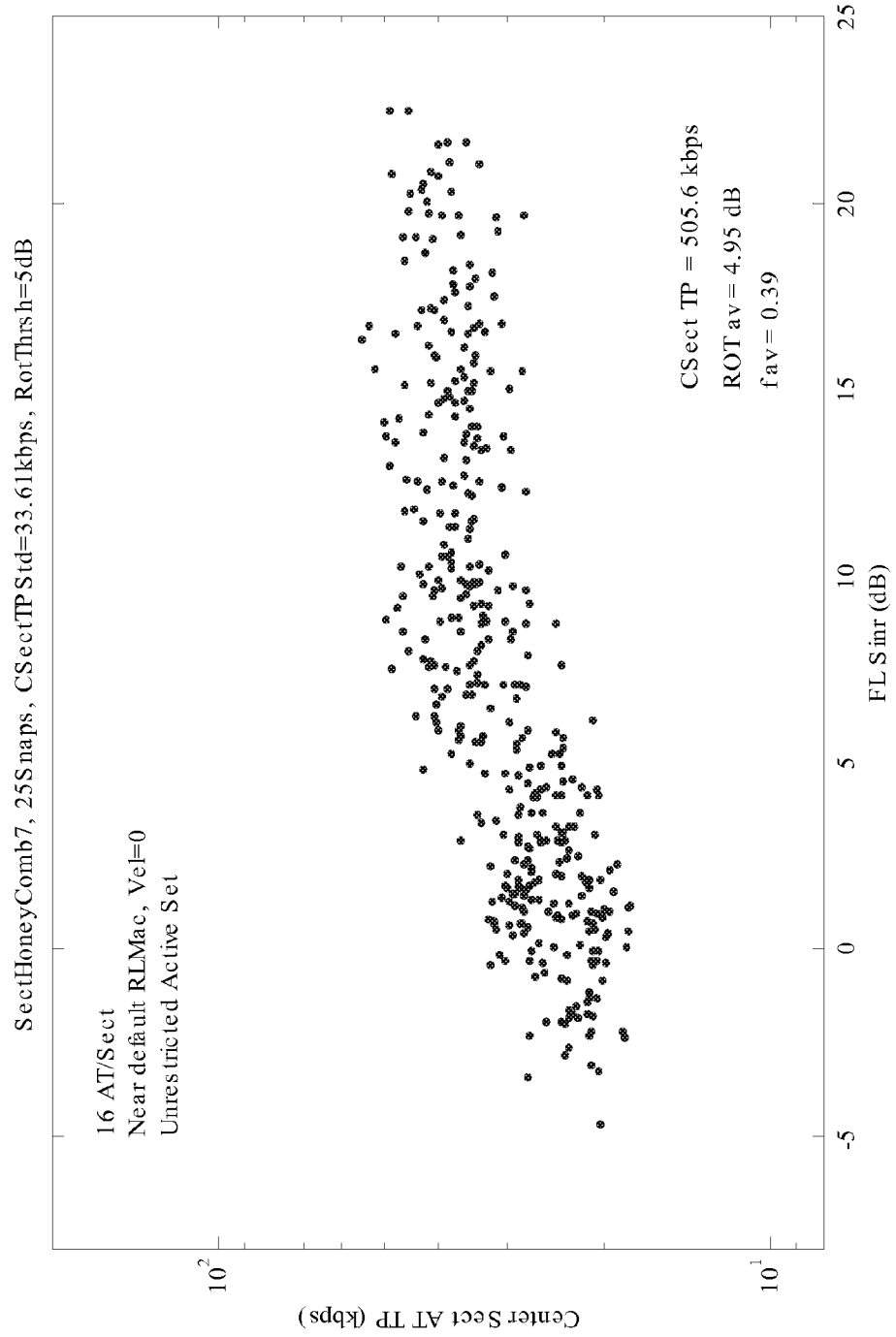
FIG. 2A is an illustration of a throughput profile as a function of forward link channel quality for multiple access terminals.

FIG. 2A illustrates a plot of the throughput for each of multiple ATs in the system 100 as a function of an associated FL channel quality. The shape of the plot reflects a RL profile for the ATs in the system. As illustrated, the throughput of an AT is approximately proportional to the serving sector FL Signal-to-Interference and Noise Ratio (SINR). Generally, the closer an AT is to a sector antenna, the higher the SINR and therefore, the higher the throughput. These algorithms assume that on an average the channel conditions on the forward and reverse link are symmetric. As illustrated, the current RL rate allocation algorithm does not result in equal grade of service for those ATs located far from a sector antenna. In one embodiment, CSect TP=505.6 kbps, ROT av=4.95 dB and fav=0.39. Further, the illustration of FIG. 2A may include 16 AT/Sect, Near default RLMAC, Vel=0 and an unrestricted active set. Additional properties of FIG. 2A may include SectHoneyComb7, 25 Snaps, CSectTPStd=33.61 kbps and RotThrsh=5 dB.

Figure 2B:
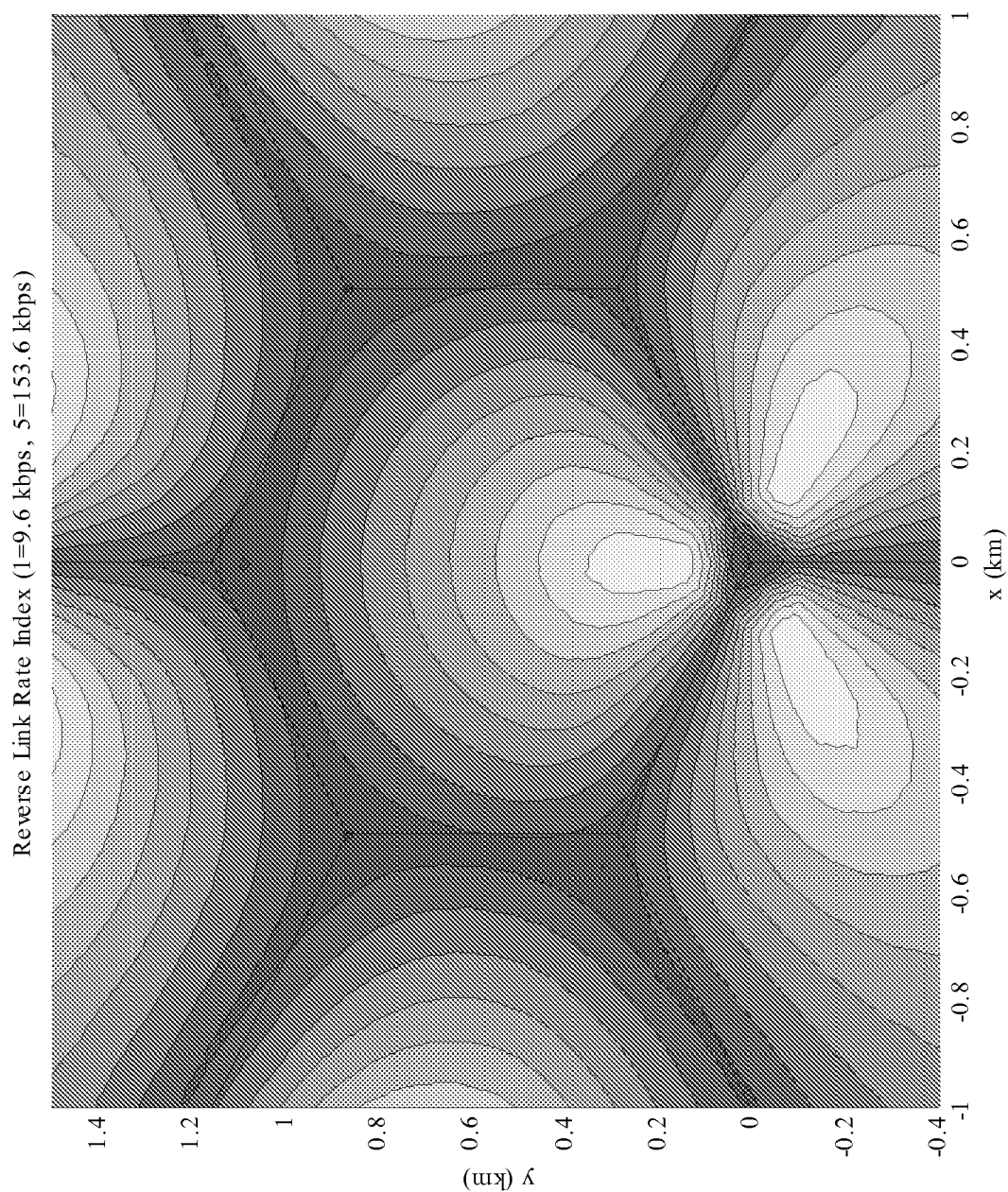
FIG. 2B is an illustration of a rate profile for the reverse link in a wireless communication system.

When an AT is in soft-handoff its overhead channel and traffic transmissions are decoded at multiple cells. The RL rate shaping can be based on criteria other than FL serving sector SINR. The rate shaping criteria may be based on a FL captured SINR (i.e., the sum total of the SINR of all pilots in the active set). As discussed hereinbelow, FIG. 2B illustrates a rate profile for the RL considering multiple sectors and multiple mobile stations or ATs. As illustrated, it's a contour plot of RL rate based on FL SINR in a multi-sector layout. The bright areas correspond to the better channel conditions, wherein the channel condition degrades with distance from the transmitter. The sector boundaries are overlaid to the figure. In one embodiment, the x and y axis are measured in kilometers (km). The reverse link rate index may include the first slot of the index being eciual to 9.6 kbps and the fifth slot of the index being equal to 153.6 kbps.

It is desirable to determine a RL profile that supports a variety of desired services for multiple ATs in system 100. Note that RL rate shaping should not preclude a mobile station from utilizing a given service. For example, videoconferencing may require 64 kbps, and therefore, all mobile stations may be allowed to transmit at 76.8 kbps as needed. Providing equal Grade of Service may not be a requirement for all systems. The desired shape of the profile is determined based on the goals and requirements of a given system. The determination of a desired shape of the profile and the implementation of a rate allocation method to achieve the desired shape is generally referred to as "rate shaping." In one embodiment, rate shaping involves dynamic rate allocation at the AT, and specifically modification of the rate allocation algorithm to consider a quality measure of the FL, such as serving sector SINR. Such reverse link rate allocation, also referred to as rate shaping, limits the interference due to terminals in handoff regions. This is achieved either by limiting the max RL rate or by reducing the likelihood that a terminal in handoff regions transmits at the highest rates, wherein terminals in handoff region are allowed to transmit at the highest rates in the case of an unloaded system.

Rate Allocation Algorithm

The AT implements an algorithm for rate allocation that considers: 1) pending data; 2) available transmit power for traffic as determined based on the difference between the overhead channel transmit power and the maximum transmit power; 3) Closed Loop Resource Allocation (CLRA); and 4) maximum data rate. The algorithm determines a data rate associated with each of the four considerations, and selects the minimum rate. The AT updates the data rate periodically. In a 1xEV-DO system, the AT updates the data rate every 16 slots, however, alternate systems may implement another scheme for updating the data rate. The pending data has an associated data rate, R1, that increases proportionally with the amount of data in a data queue at the AT. The RL data allowed for transmission may be limited by the available PA headroom. This rate R2<=R1. if PA headroom is sufficient to support R1, then R2=R1; otherwise, R2<R1.

The CLRA, discussed in detail hereinbelow, has an associated data rate R3, which is determined based on RL rate transition probabilities. The maximum data rate is identified as R4 and may be set by the AN.

The CLRA limits changes in the data rate, and specifically limits increases so as to avoid large increases in data rates by multiple ATs in quick succession that may overload the system. Note that a Reverse Activity Bit (RAB) is a mechanism to identify a RL loaded condition to the AT. The RAB mechanism has a delay incurred by the time(s) required for: 1) measurement of the load at the BS; 2) the subsequent transmission of the RAB to terminals; and 3) implementation at the AT to reduce/increase their data rate. The data rate R3 associated with the CLRA calculation is determined based on the previous data rate, referred to as $R_{old}$. Two sets of transition probabilities are provided by the AN. Each set assigns a transition probability to each of the allowable data rates. The first set corresponds to transitions that increase the data rate. The second set corresponds to transitions that decrease the data rate.

Figures 3, 4, 5, 7:
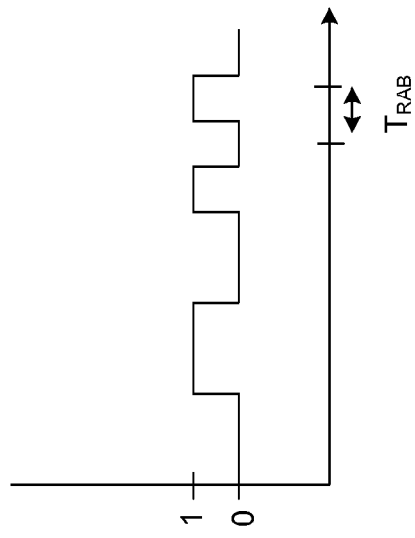
FIG. 3 is a table of data rates available in a communication system.
FIG. 4 is an illustration of transition probabilities used for reverse link rate allocation in a communication system.
FIG. 5 is a graph of reverse activity bits in a high data rate communication system.
FIG. 7 is a table for determining a maximum reverse link data rate as a function of forward link signal to interference and noise ratio.

The present instantiation of IS-856 allows five data rates on the RL starting with a minimum rate of 9.6 kbps. The rates of one embodiment supporting the 1xEV-DO standard are illustrated in FIG. 3. The rate index identifies each corresponding data rate. Each successive data rate is twice the previous rate. FIG. 4 illustrates the transition probability sets generated in the CLRA calculation. On the top is the first set of transition probabilities, identified as $P_{UP}$. On the bottom is the second set of transition probabilities, identified as $P_{DN}$. The indices, such as given in FIG. 3, point to the associated transition probabilities in each set.

The AN transmits a busy bit, referred to as the Reverse link Activity Bit (RAB). FIG. 5 illustrates the RAB values over time for a given AN. As illustrated, the RAB may be set or cleared depending on the loading of the AN. The RAB is transmitted with a period $T_{RAB}$. The RAB setting (1 or 0) indicates to each AT whether or not the system is loaded. For the current discussion assume the RAB is set to indicate a loaded condition and cleared otherwise. Alternate methods may be implemented for conveying reverse link loading information to the AT. When the AT receives the RAB (or other indication that the system is loaded), the AT has two decision options for rate allocation: 1) decrease the data rate; or 2) maintain the current data rate $R_{OLD}$. In making the decision, the AT applies the second set of transition probabilities. The AT selects the transition probability within the second set $P_{DN}$ that corresponds to the current data rate $R_{OLD}$.

If the AT receives a cleared RAB, or other indication that the system is not loaded, the AT has two decision options for rate allocation: 1) increase the data rate; or 2) maintain the current data rate, $R_{OLD}$. The AT selects a transition probability from the first set Pup. Again the particular transition probability selected corresponds to the current data rate $R_{OLD}$.

For each rate allocation update, the AT then generates a random number for comparison to the selected transition probability. The result of the comparison determines which of the two decision options the AT will make. Effectively the transition probability determines the percentage of time a data rate change will be made. Typically, for low data rates the transition probabilities will be higher, wherein any random number less than the transition probability will result in a data rate increase. The transition probabilities are generally constrained as:

$$P1 > P2 > P3 > P4 > P5. \quad (1)$$

Figure 6:
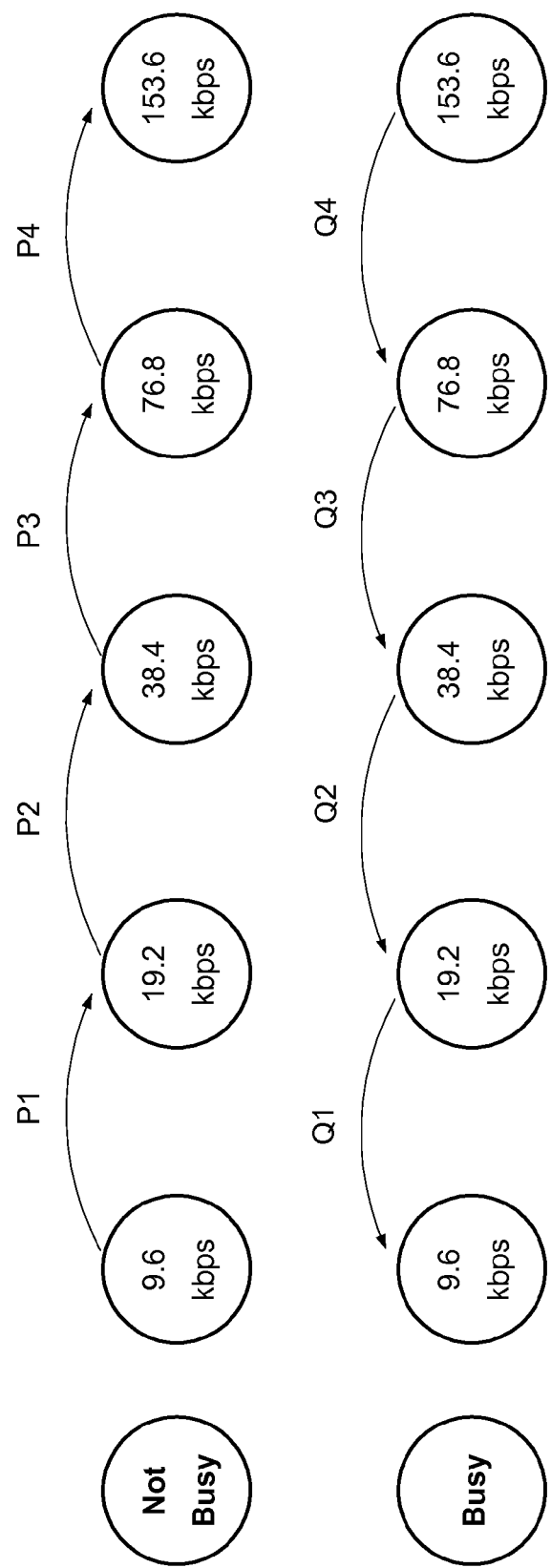
FIG. 6 is an illustration of transition probabilities in a wireless communication system.

As illustrated in FIG. 6, each probability is associated with a specific transition. Alternate probability assignments are also possible, wherein a transition probability may be associated with multiple possible transitions. The upper row illustrates the transition probabilities for increases in data rate when the system is determined as not busy. The not busy indication may be made by a message or bit from the transmitter on the FL, or may be based on a measurement of channel quality or some other link criteria. FL channel quality considerations are discussed hereinbelow. The lower row illustrates the transition probabilities corresponding to decreases in data rates when the system is determined to be busy. Again, the busy indication may be made by a message or bit from the transmitter on the FL, or may be based on a measurement of channel quality or some other link criteria. The last data rate on the right corresponds to the maximum data rate. In the system discussed herein as an example, the system supports four data rates. It is possible to limit the maximum data rate, in which case the total number of available data rates is reduced.

The transition probabilities are therefore used to determine a data rate decision of the CLRA calculation. In effect, the CLRA associated data rate R3 will be $R_{OLD}$, ($R_{OLD}$/2), ($R_{OLD}$*2), limiting the rate change. As discussed hereinabove, the AT then determines the minimum of the data rates R1, R2, R3, and R4, and applies the minimum data rate.

$$R_{NEW} = \min(R1, R2, R3, R4) \quad (2)$$

Adjust Maximum Data Rate

In one embodiment, the rate allocation algorithm is modified to consider the FL serving sector SINR as measured and/or estimated at the AT. The FL serving sector SINR is used to limit the maximum data rate allowable for RL transmissions of the AT. FIG. 7 illustrates a table identifying the associated maximum data rate for the RL as a function of FL SINR values. The illustrated table includes three SINR value ranges: 1) less than 0 dB; 2) from 0 dB to 4 dB; and 3) greater than 4 dB. Note that alternate embodiments may implement a different number of ranges, as well as different ranges. The mapping of SINR value to maximum RL data rate may be a formula rather than a look up table. Similarly, alternate maximum RL data rates may be implemented. Also indicate that 5 max rate levels can be used as we have 5 defined rates on the RL. It should also be made clear that additional levels may be used if additional rates are added on the RL.

The system 100 supports the IS-856 standard, and therefore, each AT determines a data rate for the FL as a function of the FL quality, such as by use of the FL SINR. The AT then sends a data rate request on a Data Rate Channel (DRC). The DRC data rate request indicates the data rate at which the AT is able to receive data communications. The AN then uses this information to schedule transmissions to ATs for which data is pending at the AN. As the data rate request is determined in response to the FL SINR, the DRC data rate request may be used to determine the maximum RL data rate.

In another embodiment, the maximum RL data rate may be limited as a function of the RL channel state. In system 100, supporting the 1xEV-DO standard, the ATs are required to continually transmit a RL pilot signal. The RL pilot signal is transmitted on a pilot channel, which is power controlled. The RL traffic channel is power controlled based on the RL pilot, i.e., the RL traffic channel power is relative to the pilot channel power and the traffic-channel-to-pilot-channel power ratios are predetermined. Variations on the pilot channel are due to changes in channel conditions. The variations in power on the traffic channel are those on the pilot channel as well as due to the bursty-nature of packet data transmissions. For this reason, large changes in the RL pilot power corresponds to a RL channel state change, i.e., change in RL channel quality. Sudden changes in RL channel conditions may result in increased interference to terminals in adjacent sectors. This algorithm avoids sudden changes in RL channel conditions from resulting in increased interference by limiting the max. RL transmit rate in case of sudden changes in RL channel conditions, e.g., if the AT transmits at high rates in good channel conditions, sudden degradation in channel condition (which is OK for the RL to the power controlling sector) the AT continuing to transmit at high RL rates may result in higher levels of interference to terminals in adjacent sectors.

If the instantaneous RL pilot power (transmit power) is above a given threshold with respect to the average pilot power, the maximum RL data rate is limited to a given data rate. The data rate may be limited to a predetermined data rate or may be calculated as a function of the current data rate, loading of the system, or some other parameter. The use of the RL channel state information may be implemented with the FL channel quality information to limit the maximum RL data rate.

In still another embodiment, the maximum RL data rate may be limited by the AN, wherein the AN measures the differential Rise-Over-Thermal (ROT) between neighboring sectors. The ROT is a metric calculated for a sector i, given as:

$$ROT = \frac{I_{0_i}}{N_{0_i}} = \frac{\text{total received power}}{\text{thermal noise floor}} \quad (3)$$

wherein the subscript "i" indicates the sector i. A comparison of ROT values for neighboring sectors, such as sectors i and j, is given as:

$$\Delta ROT = \frac{I_{0_i}}{N_{0_i}} - \frac{I_{0_j}}{N_{0_j}} \quad (4)$$

With respect to FIG. 1, a comparison of the ROT for sectors 112 and 114 is performed at a Base Station Controller (BSC) (not shown). Each BS sends an ROT value corresponding to the sector served by the BS. The BSC may then adjust the maximum RL data rate and/or transition probabilities for Access Terminals (ATs) within the sectors. As an example, consider a system incorporating a predetermined target $r_t$, wherein an ROT that is greater than 3 dB above the target $r_t$ indicates a loaded condition for that sector. If a first sector has an ROT calculated as $r_1 = r_t - 3$ dB, and a second sector has an ROT calculated as $r_2 = r_t + 3$ dB, then the BSC may decide to implement a plan as follows. For a Mobile Station (MS) having an Active Set (AS) containing sector 1 but not sector 2, the BSC may lower the maximum data rate of the MS. The MS is in communication with sector 1, which is not loaded, but is not able to utilize sector 2, which is not loaded. Therefore, unless the MS is limited to a lower maximum data rate it may cause significant interference.

If the differential ROT exceeds a threshold, terminals that have only the lightly loaded sector in their active set are required to limit their max rate. In one embodiment, the maximum RL data rate is set to 38.4 kbps. In an alternate embodiment, the AT measures the captured SINR which is the sum total of the forward link SINR received at the AT. The captured SINR is used to determine if adjustment is made to the transition probabilities stored at the AT. For captured SINR above a target threshold, the AT may adjust the maximum data rate to allow higher data rates. Conversely, for captured SINR below a target threshold, the AT may adjust the maximum data rate to limit the AT to lower data rates. Two distinct thresholds may be used for the two cases given.

Adjusting RL Transition Probabilities in Response to FL Channel Condition

In another embodiment, different sets of RL data rate transition probabilities are assigned to ATs as a function of the FL sector SINR. The rate shaping may be implemented adjusting the transition probabilities in response to perceived channel quality. Improved channel quality will result in transition probabilities that encourage increases in RL data rates. Degraded channel quality will result in transition probabilities that encourage decreases in RL data rates. Such probabilistic rate shaping may also be applied to maximum RL data rate limiting as a function of SINR.

Each AT measures the channel quality of the FL received signal. In response thereto, the AT may choose to maintain the current values of the transition probabilities, as illustrated in FIG. 6, or may choose to adjust one or more of the probabilities. For example, if the channel quality measurement, such as an SINR measurement, is above a predetermined threshold, the probabilities may be changed to encourage higher data rates. In other words, the transition probabilities may be modified to increase the probability of making the associated transitions. Similarly, if the channel quality measurement is below another such threshold, the transition probabilities are adjusted to discourage higher data rates. Note that a single threshold may be used, or a range of values, wherein for quality measurement values within the range of values the current transition probabilities are maintained, and for quality measurement values outside the range of values the current transition probabilities are adjusted. In one embodiment, each individual transition, e.g., p1, p2, etc., has an associated threshold or thresholds for adjustment decisions. In addition to adjusting the transition thresholds, or instead of adjusting the transition thresholds, the AT may adjust the maximum allowable data rate in response to a channel quality measurement. This may result in the addition of data rates, and thus additional transition probabilities for those rates, or may result in the elimination of data rates, and thus the elimination of the transitional probabilities associated with the eliminated data rates. For example, as illustrated in FIG. 6, if the maximum rate for the AT is reduced to 76.8 kbps, then the rate 153.6 kbps is ignored or eliminated, as are the transition probabilities P4 and Q4 respectively. The RL transition probabilities may be adjusted based on captured SINR or RL channel conditions.

Figure 8:
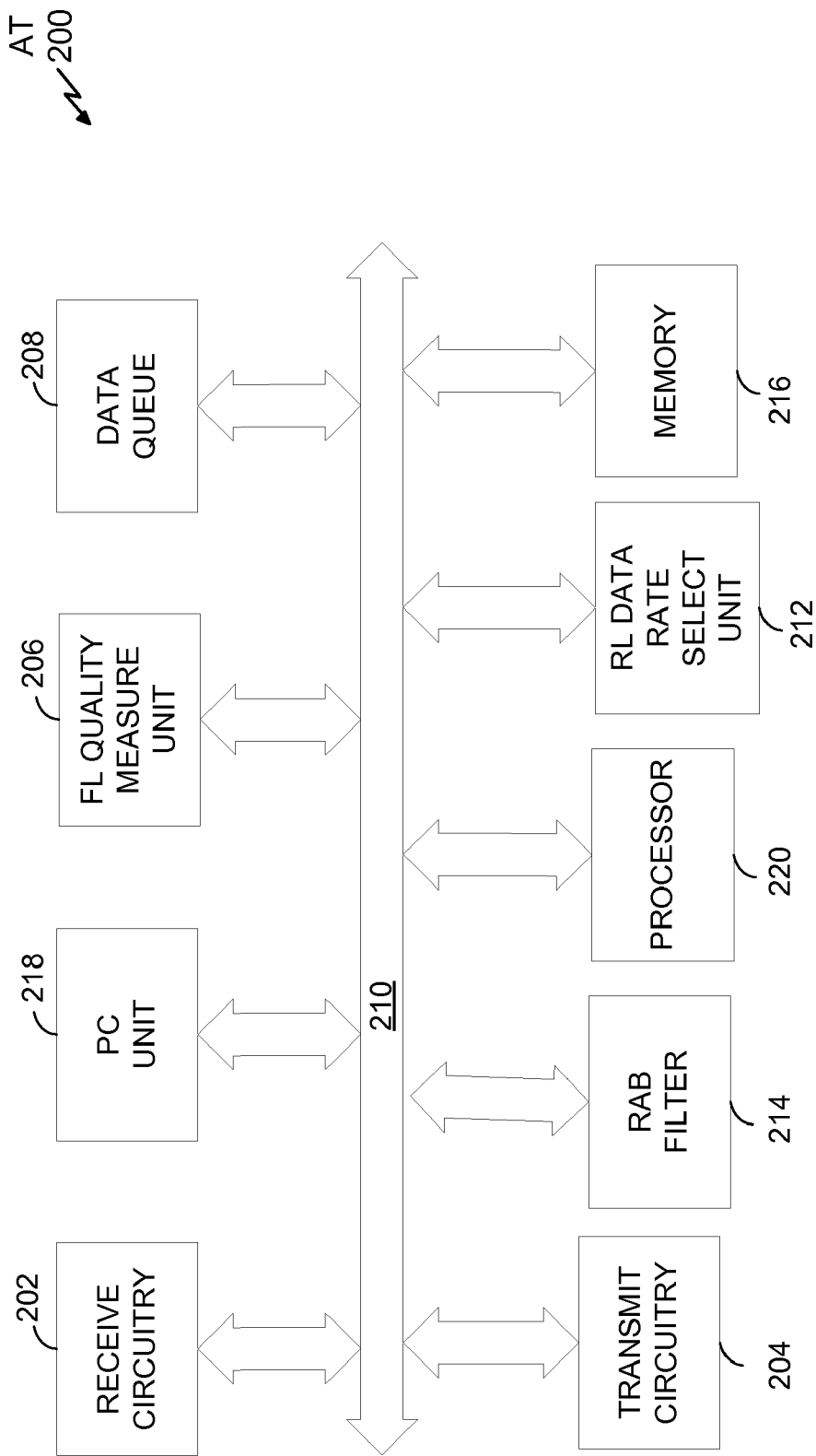
FIG. 8 is an Access Terminal.

FIG. 8 illustrates an AT 200 configured for RL rate allocation as a function of FL channel quality. AT 200 includes receive circuitry 202 and transmit circuitry 204, each coupled to a communication bus 210. The receive circuitry 202 provides a received sample to FL quality measure unit 206 which determines the FL quality based on samples received via the FL. The FL quality measure unit 206 may measure/estimate SINR or some other parameter associated with link quality. The AT 200 also includes a data queue 208 that stores data pending for transmission by AT 200, a memory 216 that stores tables and other information associated with data rate allocation on the RL. A RL data rate select unit 212 is also coupled to the communication bus 210 and determines a RL data rate as a function of the FL channel quality. Note that RL data rate select unit 212 performs any of the intermediate calculations required to determine a data rate, such as the steps of the data rate allocation algorithm discussed hereinabove. For example, data rate allocation may involve determining a maximum data rate, the amount of data pending, the transmit power, and/or CLRA calculations. A Power Control (PC) unit 218 is coupled to the communication bus 210 and implements a PC mechanism to adjust the transmit power of the AT 200. An RAB filter 214 tracks the historical system loading information. A processor 220 controls the various functions of AT 200. Alternate embodiments may include some or all of the functional blocks described in FIG. 8. Additional functional blocks may be implemented within AT 200. Note that while FIG. 8 illustrates all functional blocks communicating through a communication bus 210, alternate configurations may implement direct connections between functional blocks as desirable.

Figure 9:
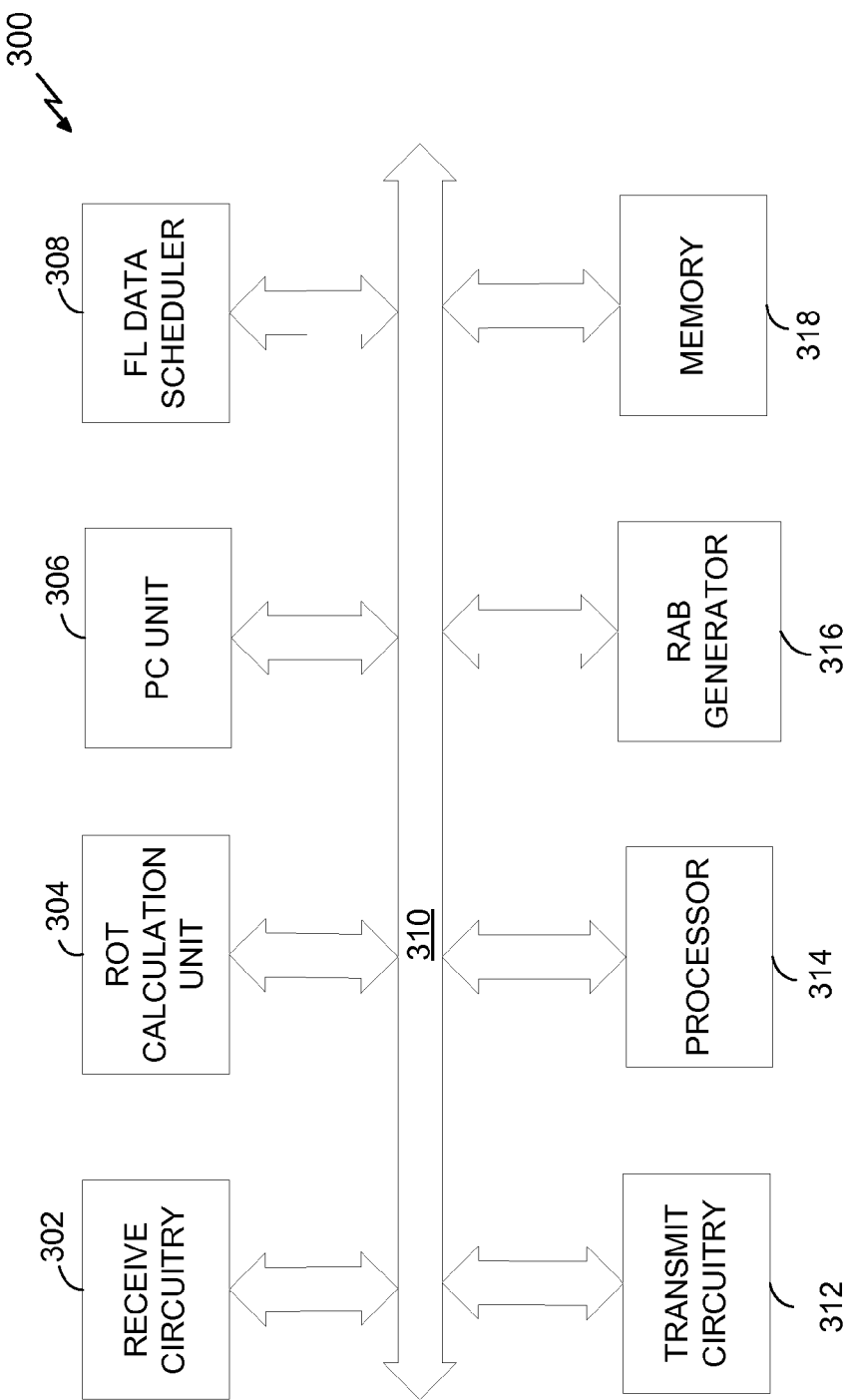
FIG. 9 is an infrastructure element of an Access Network.

FIG. 9 illustrates an infrastructure element of AN 300, which may be a Base Station Controller (BSC). A communication bus 310 is illustrated to facilitate communication and exchange of information within the AN infrastructure element 300. Receive circuitry 302 and transmit circuitry 312 are each coupled to communication bus 310. A ROT calculation unit 304 determines the ROT of each of multiple neighboring sectors and determines a maximum RL rate limit in response. A PC unit 306 controls RL power control and generates PC instructions for each AT. A FL data scheduler 308 schedules transmissions to the various ATs on the FL. A memory 318 and processor 314 are also coupled to communication bus 310. The RAB generator 316 determines the loading of the system and generates the RAB in response.

In an alternate embodiment, a BSC receives ROT from multiple BSs, as discussed hereinabove. The BSC compares neighboring sector ROT values. The BSC may then adjust the transition probabilities of ATs within a given sector based on the comparison information. For example, the BSC may adjust the transition probabilities of those ATs that only have the unloaded sector in their active set and are not able to utilize the loading information from a loaded neighboring sector, so as to encourage lower data rates.

In an alternate embodiment, the AT measures the captured SINR which is the sum total of the forward link SINR received at the AT. The captured SINR is used to determine if adjustment is made to the transition probabilities stored at the AT. For captured SINR above a target threshold, the AT may adjust the transition probabilities to encourage higher data rates. Conversely, for captured SINR below a target threshold, the AT may adjust the transition probabilities to discourage higher data rates. Two distinct thresholds may be used for the two cases given.

Note that the functional blocks are provided to illustrate the functionality of the AT 200 and infrastructure element 300, and therefore, alternate embodiments may implement such functionality in different configurations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for reverse link rate allocation in a wireless communication system, comprising:
    determining channel quality of a forward link;
    selecting a transition probability associated with a current data rate;
    generating a random number for comparison to the selected transition probability;
    increasing the current data rate if the random number is less than the selected transition probability;
    determining a maximum reverse link data rate as a function of the channel quality of the forward link; and
    transmitting data on the reverse link at a data rate less than or equal to the maximum reverse link data rate.

2. The method as in claim 1, wherein determining the channel quality of the forward link comprises measuring a signal-to-noise ratio of the forward link of a serving sector, and
    wherein determining the maximum reverse link data rate comprises comparing the signal-to-noise ratio of the forward link of the serving sector to a threshold.

3. The method as in claim 2, wherein the reverse link supports a plurality of data rates, and wherein transition probabilities are assigned to transitions between the plurality of data rates.

4. The method as in claim 1, wherein determining channel quality comprises determining channel quality of a forward link by measuring a captured signal to noise ratio of the forward link.

5. A method for reverse link rate allocation in a wireless communication system, comprising:
    determining a data rate control request identifying a data rate for the reverse link;
    determining a maximum reverse link data rate as a function of the data rate control request;
    determining a transition probability as a function of the data rate control request, wherein the transition probability indicates the probability of adjusting reverse link rate allocation;
    generating a random number for comparison to the transition probability;
    increasing a current data rate if the random number is less than the transition probability; and
    transmitting data on the reverse link at a data rate less than or equal to the maximum reverse link data rate.

6. The method as in claim 5, wherein determining the data rate control request comprises:
   measuring a signal-to-noise ratio of a forward link; and
   comparing the signal-to-noise ratio of the forward link to a threshold.

7. A method for reverse link rate allocation in a wireless communication system, comprising:
   determining channel quality of a reverse link;
   determining a maximum reverse link data rate as a function of the channel quality of the reverse link;
   determining a transition probability as a function of the channel quality of the reverse link, wherein the transition probability indicates the probability of adjusting reverse link rate allocation;
   generating a random number for comparison to the transition probability;
   increasing a current data rate if the random number is less than the transition probability; and
   transmitting data on the reverse link at a data rate less than or equal to the maximum reverse link data rate.

8. The method as in claim 7, wherein determining the channel quality of the reverse link comprises:
   transmitting a reverse link pilot signal having an associated transmit pilot power;
   calculating an average transmit pilot power of the reverse link;
   calculating an instantaneous transmit pilot power of the reverse link; and
   comparing the instantaneous transmit pilot power of the reverse link to the average transmit pilot power of the reverse link.

9. The method as in claim 8, wherein calculating the average transmit pilot power of the reverse link comprises filtering the transmit pilot power over a first number of time slots.

10. A method for reverse link rate allocation in a wireless communication system, comprising:
    receiving a first rise over thermal value from a first base station associated with a first sector;
    receiving a second rise over thermal value from a second base station associated with a second sector, wherein the first sector and second sector are neighboring sectors;
    comparing the first rise over thermal value to the second rise over thermal value; and
    setting a reverse link maximum data rate based on comparing the first rise over thermal value to the second rise over thermal value.

11. The method as in claim 10, wherein the first and second sectors are neighbors.

12. The method as in claim 11, wherein setting the reverse link maximum data rate comprises:
    determining a difference between the first and second rise over thermal values; and
    comparing the difference to a threshold.

13. An apparatus for reverse link rate allocation in a wireless communication system, comprising:
    means for determining channel quality of a forward link;
    means for selecting a transition probability associated with a current data rate;
    means for generating a random number for comparison to the selected transition probability;
    means for increasing the current data rate if the random number is less than the selected transition probability;
    means for determining a maximum reverse link data rate as a function of the channel quality of the forward link; and
    means for transmitting data on the reverse link at a data rate less than or equal to the maximum reverse link data rate.

14. The apparatus as in claim 13, wherein the means for determining the channel quality of the forward link comprises means for measuring a signal-to-noise ratio of the forward link, and
    wherein the means for determining the maximum reverse link data rate comprises means for comparing the signal-to-noise ratio of the forward link to a threshold.

15. The apparatus as in claim 14, wherein the reverse link supports a plurality of data rates, and wherein transition probabilities are assigned to transitions between the plurality of data rates.

16. An apparatus for reverse link rate allocation in a wireless communication system, comprising:
    means for determining a data rate control request identifying a data rate for the reverse link;
    means for determining a maximum reverse link data rate as a function of the data rate control request;
    means for determining a transition probability as a function of the data rate control request, wherein the transition probability indicates the probability of adjusting reverse link rate allocation;
    means for generating a random number for comparison to the transition probability;
    means for increasing a current data rate if the random number is less than the transition probability; and
    means for transmitting data on the reverse link at a data rate less than or equal to the maximum reverse link data rate.

17. The apparatus as in claim 16, wherein the means for determining the data rate control request comprises:
    means for measuring a signal-to-noise ratio of a forward link; and
    means for comparing the signal-to-noise ratio of the forward link to a threshold.

18. An apparatus for reverse link rate allocation in a wireless communication system, comprising:
    means for determining channel quality of a reverse link;
    means for determining a maximum reverse link data rate as a function of the channel quality of the reverse link
    means for determining a transition probability as a function of the channel quality of the reverse link, wherein the transition probability indicates the probability of adjusting reverse link rate allocation;
    means for generating a random number for comparison to the transition probability;
    means for increasing a current data rate if the random number is less than the transition probability; and
    means for transmitting data on the reverse link at a data rate less than or equal to the maximum reverse link data rate.

19. The apparatus as in claim 18, wherein the means for determining the channel quality of the reverse link comprises:
    means for transmitting a reverse link pilot signal having an associated transmit pilot power;
    means for calculating an average transmit pilot power of the reverse link;
    means for calculating an instantaneous transmit pilot power of the reverse link;
    means for comparing the instantaneous transmit pilot power of the reverse link to the average transmit pilot power of the reverse link.

20. The apparatus as in claim 19, wherein calculating the average transmit pilot power of the reverse link comprises filtering the transmit pilot power over a first number of time slots.

21. An apparatus for reverse link rate allocation in a wireless communication system, comprising:
    means for measuring a first rise over thermal value of the forward link for a first sector;

means for measuring a second rise over thermal value of the forward link for a second sector;

means for comparing the first rise over thermal value to the second rise over thermal value; and means for setting a reverse link maximum data rate based on comparing the first rise over thermal value to the second rise over thermal value.

22. The apparatus as in claim 21, wherein the first and second sectors are neighbors.

23. The apparatus as in claim 22, wherein the means for setting the reverse link maximum data rate comprises:

means for determining a difference between the first and second rise over thermal values; and means for comparing the difference to a threshold.

24. An apparatus for reverse link rate allocation in a wireless communication system, comprising:

a processing unit configured to:

determine channel quality of a forward link;

select a transition probability associated with a current data rate;

generate a random number for comparison to the selected transition probability;

increase the current data rate if the random number is less than the selected transition probability;

determine a maximum reverse link data rate as a function of the channel quality of the forward link; and transmit data on the reverse link at a data rate less than or equal to the maximum reverse link data rate.

25. An apparatus for reverse link rate allocation in a wireless communication system, comprising:

a processing unit configured to:

determine a data rate control request identifying a data rate for the reverse link;

determine a maximum reverse link data rate as a function of the data rate control request;

determine a transition probability as a function of the data rate control request, wherein the transition probability indicates the probability of adjusting reverse link rate allocation;

generate a random number for comparison to the transition probability;

increase a current data rate if the random number is less than the transition probability; and transmit data on the reverse link at a data rate less than or equal to the maximum reverse link data rate.

26. An apparatus for reverse link rate allocation in a wireless communication system, comprising:

a computer-readable medium encoded with computer-executable instructions; memory storage device; and a processing unit coupled to the memory storage device and adapted for:

measuring a first rise over thermal value of the forward link for a first sector;

measuring a second rise over thermal value of the forward link for a second sector;

comparing the first rise over thermal value to the second rise over thermal value; and setting a reverse link maximum data rate based on comparing the first rise over thermal value to the second rise over thermal value.

27. A computer-readable medium encoded with computer executable instructions for:

determining channel quality of a forward link;

selecting a transition probability associated with a current data rate;

generating a random number for comparison to the selected transition probability;

increasing a current data rate if the random number is less than the selected transition probability;

determining a maximum reverse link data rate as a function of the channel quality of the forward link; and transmitting data on the reverse link at a data rate less than or equal to the maximum reverse link data rate.

28. A computer-readable medium encoded with computer executable instructions for:

determining a data rate control request identifying a data rate for the reverse link;

determining a maximum reverse link data rate as a function of the data rate control request;

determining a transition probability as a function of the data rate control request, wherein the transition probability indicates the probability of adjusting reverse link rate allocation;

generating a random number for comparison to the transition probability; increasing a current data rate if the random number is less than the transition probability; and transmitting data on the reverse link at a data rate less than or equal to the maximum reverse link data rate.

* * * * *